(12) United States Patent
Baugh et al.

(10) Patent No.: US 12,028,005 B2
(45) Date of Patent: Jul. 2, 2024

(54) SYSTEM AND METHOD FOR RIPPLE COUNT DETECTION

(71) Applicant: HELLA GMBH & CO. KGAA, Lippstadt (DE)

(72) Inventors: Josh Baugh, Clawson, MI (US); Gary Neill, Huron Township, MI (US); Ninh Quyen, Plymouth, MI (US); Jason Soltis, Canton, MI (US)

(73) Assignee: HELLA GMBH & CO. KGAA, Lippstadt (DE)

( * ) Notice: Subject to any disclaimer, the term of this patent is extended or adjusted under 35 U.S.C. 154(b) by 144 days.

(21) Appl. No.: 17/893,917

(22) Filed: Aug. 23, 2022

(65) Prior Publication Data

US 2024/0072705 A1 Feb. 29, 2024

(51) Int. Cl.
*H02P 23/14* (2006.01)
*G01D 5/14* (2006.01)

(52) U.S. Cl.
CPC ............... *H02P 23/14* (2013.01); *G01D 5/14* (2013.01)

(58) Field of Classification Search
CPC .................................. H02P 23/14; G01D 5/14
See application file for complete search history.

(56) References Cited

U.S. PATENT DOCUMENTS 8,310,185 B2 * 11/2012 Knezevic ................. H02P 7/00
318/400.23
10,536,100 B2   1/2020 Jordan et al.
2003/0111996 A1   6/2003 Otte
2004/0111233 A1   6/2004 Gerlach
2009/0254300 A1  10/2009 Schneider et al.

FOREIGN PATENT DOCUMENTS

JP         2012254014 A   * 12/2012

OTHER PUBLICATIONS

"Automotive Brushed-Motor Ripple Counter Reference Design for Sensorless Position Measurement", TIDUD30A—Jul. 2017—Revised Jun. 2018 found at: https://www.ti.com/tool/TIDA-01421#tech-docs (accessed Jul. 20, 2022).
Abacan et al., "Sensorless Position Control of Brushed DC Motor Using Ripple Counting Technique", found at: https://www.microchip.com/en-US/application-notes/an3049 (Jun. 2019).

\* cited by examiner

*Primary Examiner* — Walter L Lindsay, Jr.
*Assistant Examiner* — Milton Gonzalez
(74) *Attorney, Agent, or Firm* — WARNER NORCROSS + JUDD LLP (57) ABSTRACT

A method and a system for ripple count detection of a DC motor are provided. The method and the system determine a missed ripple count for transitional phases of operation, including the start-up and/or braking phases, based on a determined ripple period or frequency in the steady-state phase of operation. By applying this determined ripple period or frequency to a transitional time interval, the number of missed ripples for each transitional phase of operation can be reliably determined in digital logic, without the aid of external positional sensors.

18 Claims, 8 Drawing Sheets

SYSTEM AND METHOD FOR RIPPLE COUNT DETECTION

FIELD OF THE INVENTION

The present invention relates to the positional control of DC (direct current) motors based on ripple count detection of the armature current.

BACKGROUND OF THE INVENTION

DC motors, for example brushed DC motors, are widely used in automotive applications to control vehicle seats, power windows, side view mirrors, and vehicle lift gates, among other systems. Brushed DC motors include stator magnets and an armature winding. The armature winding is supplied with a direct current to produce a magnetic field within the DC motor. This magnetic field interacts with the stator magnets to produce a torque, which rotates the armature. The armature then provides a motive force via rotation of an output shaft.

Positional control of the armature is critical for the safe and effective operation of the DC motor. Prior systems include Hall effect sensors to determine the armature position. More recently, sensor-less approaches determine armature position by monitoring the armature current. The armature current includes a ripple component that is superimposed onto a direct component. The ripple component is caused by the interaction of the field pattern, the armature winding, and the commutator of the brushed DC motor. By counting the number of ripples in the armature current, the rotational position and speed of the DC motor can be determined.

While existing sensor-less solutions have proven effective at determining the armature position during steady state operation, the ripple component can remain undetected during the start-up phase and the braking phase of operation. Accordingly, there remains a continued need for a sensor-less solution for determining the position of an armature during all phases of operation of a brushed DC motor, including the start-up and braking phases of operation.

SUMMARY OF THE INVENTION

According to one aspect of the invention, a method and a system for ripple count detection of a DC motor are provided. The method and the system determine a missed ripple count for transitional phases of operation, including the start-up and/or braking phases, based on a determined ripple period or frequency in the steady state phase of operation. By applying this determined ripple period or frequency to a transitional time interval, the number of missed ripples for each transitional phase of operation can be reliably determined in digital logic, without resorting to external positional sensors, for example Hall effect sensors.

In one embodiment, a method for determining the rotational position of a DC motor during start-up is provided. The method includes determining a start-up time interval between activation of the DC motor and detection of the first ripple in the motor current. The method then includes counting current ripples in the motor current during steady state operation of the DC motor. While in the steady state operating phase, the method includes determining an average ripple period or an average ripple frequency. The method then includes applying the average ripple period or average ripple frequency to the first time interval, resulting in an inrush-period ratio. The missed ripple count is then determined from the inrush-period ratio with reference to a look-up table or a formula. The missed ripple count reliably reflects the actual number of missed ripples during start-up and can be added to the counted ripples to determine motor position.

In another embodiment, a method for determining the rotational position of a DC motor during braking is provided. The method includes determining a ripple period or a ripple frequency during steady state operation of the DC motor based on a rolling sample of counted ripples, e.g., the last n-number of counted ripples. The method then includes determining a braking time interval between receiving the command to deactivate the DC motor and detecting no motor current or substantially no motor current in the DC motor. The steady state ripple period or frequency is then applied to the braking time interval to determine a brake-period ratio. The missed ripple count is then determined from the brake-period ratio with reference to a look-up table or a formula. The resulting missed ripple count reliably reflects the actual number of missed ripples during braking and can be added to the counted ripples to determine motor position.

In still another embodiment, a system for determining the rotational position of a DC motor is provided. The system includes a current sensor for sensing motor current in a DC motor, the motor current having a ripple component. The system also includes a processor for processing digital signals representing the ripple component of the motor current. The processor includes instructions in digital logic that, when executed, cause the processor to compensate for missed ripples during start-up and/or braking of the DC motor. For example, the instructions cause the processor to: (a) calculate an average ripple period or an average ripple frequency based on a plurality of ripples during a steady-state operating phase; (b) apply the average ripple period or the average ripple frequency to a transitional time interval to determine an inrush or braking-period ratio; and (c) determine a missed ripple count based on the inrush or braking-period ratio and a look-up table or a formula. The missed ripple count reliably reflects the actual number of missed ripples during start-up and/or braking for determining motor position.

As discussed herein, the present invention can be paired with an analog-to-digital circuit for converting the ripple component of a DC motor current into a digital signal for digital processing. By compensating for uncounted ripples during start-up and/or braking in digital logic, and without the aid of an external sensor, the present invention is well suited for applications where precise positional control of DC motors is required. Optional applications include the control of vehicle seats, power windows, side view mirrors, and vehicle lift gates, by non-limiting example.

These and other features and advantages of the present invention will become apparent from the following description of the invention, when viewed in accordance with the accompanying drawings and the appended claims. It will be appreciated that any of the preferred and/or optional features of the invention may be incorporated alone, or in appropriate combination, within embodiments of the invention, while still falling within the scope of claim 1, even if such combinations are not explicitly claimed in the appended claims.

DETAILED DESCRIPTION OF THE PRESENT EMBODIMENT

Figure 1:
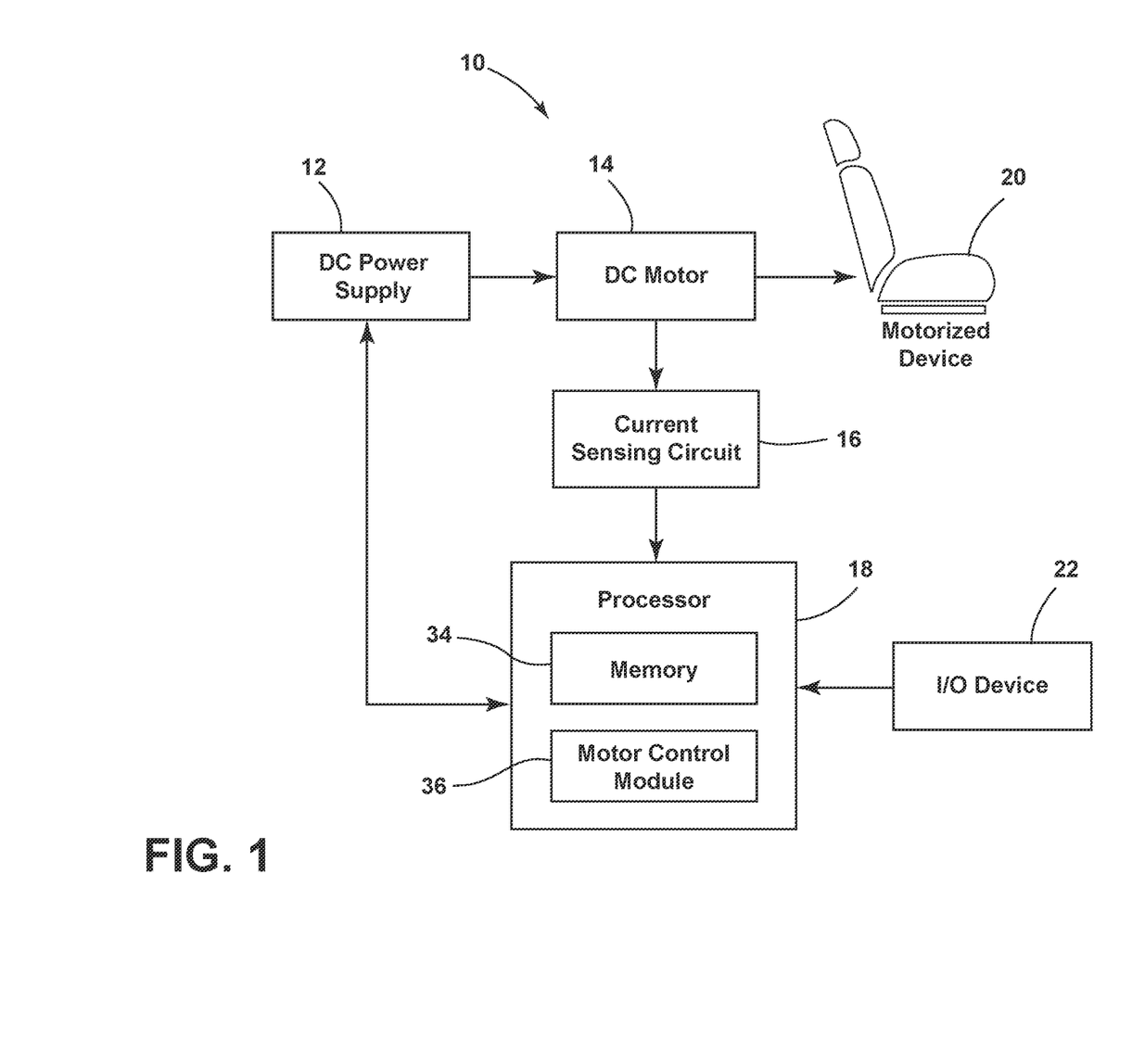
FIG. 1 is a block diagram illustrating powered vehicle seats employing a method and a system for ripple count detection of a DC motor.

In accordance with one embodiment, a system for ripple count detection is illustrated in FIG. 1 and generally designated 10. The system 10 includes a DC power supply 12, a DC motor 14, a current sensing circuit 16, and a processor 18. In the present embodiment, the DC motor 14 controls forward and aft movement of a powered vehicle seat 20 in response to forward or aft button press signals from one or more seat controls 22. The DC motor 14 can be used to control other aspects of the vehicle seat 20, for example seat height or seat angle, and can alternatively be used to control other devices, for example power windows, side view mirrors, and vehicle lift gates, by non-limiting example.

Figure 2:
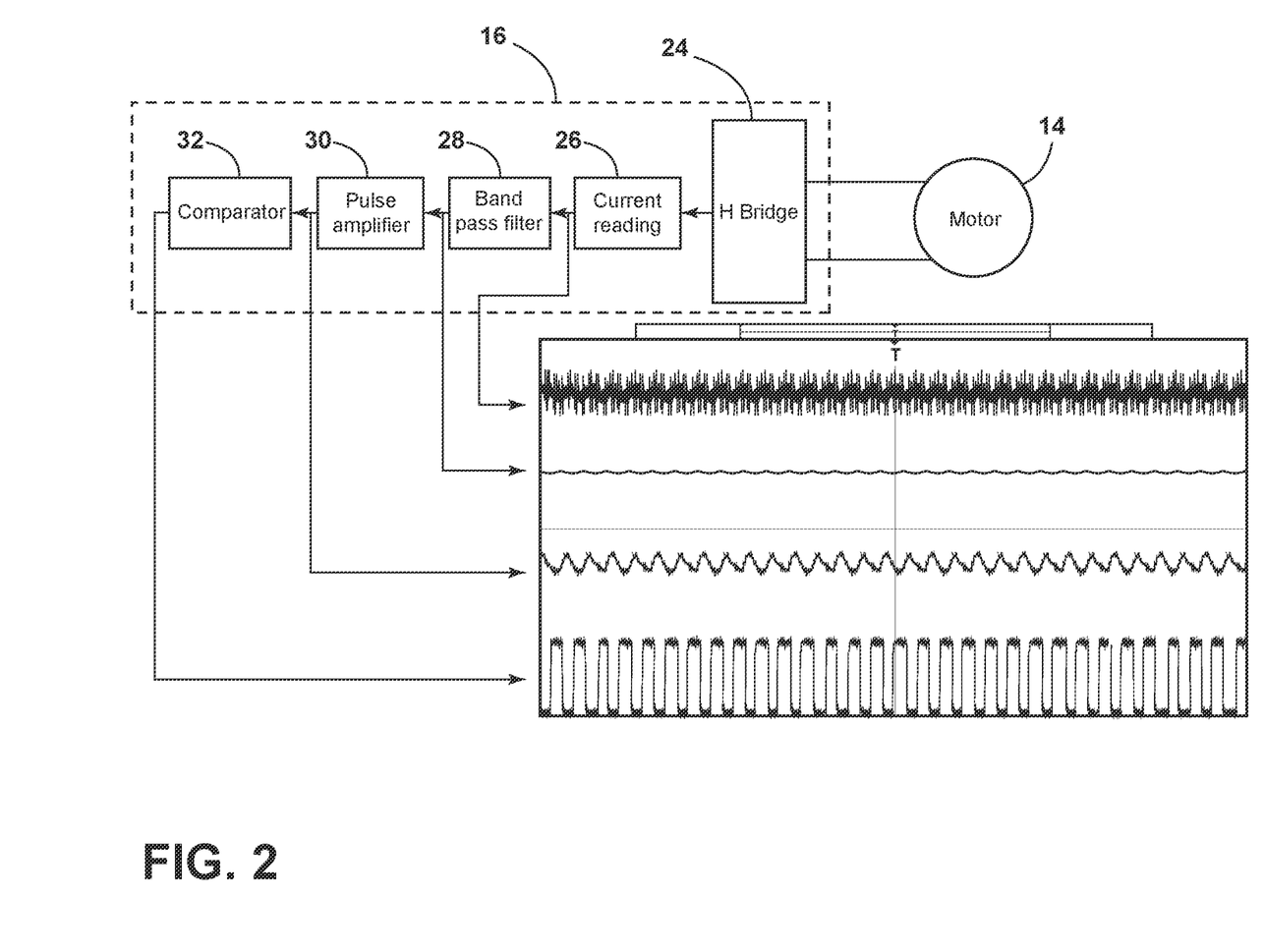
FIG. 2 is a block diagram illustrating a motor current signal as received by a current sensing circuit and the corresponding digital current ripple signal.

The DC motor 14 in the present embodiment is a brushed DC motor having an odd number of coil segments (e.g., 3, 5, 7). Rotation of the DC motor armature generates a back EMF, which in turn creates a ripple component in the motor current. The ripple component is then isolated, filtered, and converted into a digital signal by the current sensing circuit 16. As used herein, "current sensing circuit" means any circuit adapted to convert a measurement of the motor current into a digital signal that is representative of the ripple component. As optionally shown in FIG. 2 for example, the current sensing circuit 16 converts the motor current into a digital signal comprising a repeating series of rising and falling edges for output to the processor 18. More particularly, the current sensing circuit 16 includes an H-bridge 24, a current reading stage 26, an active band pass filter 28, a pulse amplifier 30, and a comparator 32. The motor current is sensed in-line with the DC motor 14 at the current reading stage 26 and is then filtered with the active band-pass filter 28 to remove noise and the DC-component variance. The motor current can be sensed other than in-line with the DC motor 14, however. The pulse amplifier 30 generates a clean, low-noise AC signal that can be measured by the comparator 32 to generate a 0-V to 3.3-V square wave with a switching frequency equal to the motor ripple fundamental frequency.

Referring again to FIG. 1, the processor 18 is coupled to the output of the current sensing circuit 16 and is adapted to control operation of the DC motor 14 (via the DC power supply 12) in response to forward or aft button press signals from one or more seat controls 22. The processor 18 includes memory 34 with machine-readable instructions that, when executed, cause the processor 18 determine the rotational position of the DC motor armature. The processor 18 also includes instructions for controlling the DC motor 14 in response to forward or aft button press signals, while in other embodiments the DC motor 14 is controlled pursuant to commands from a different processor. The memory 34 can include volatile or non-volatile memory, including but not limited to read-only memory (ROM), random access memory (RAM), electrically erasable programmable memory (EEPROM), and flash memory.

Figure 3:
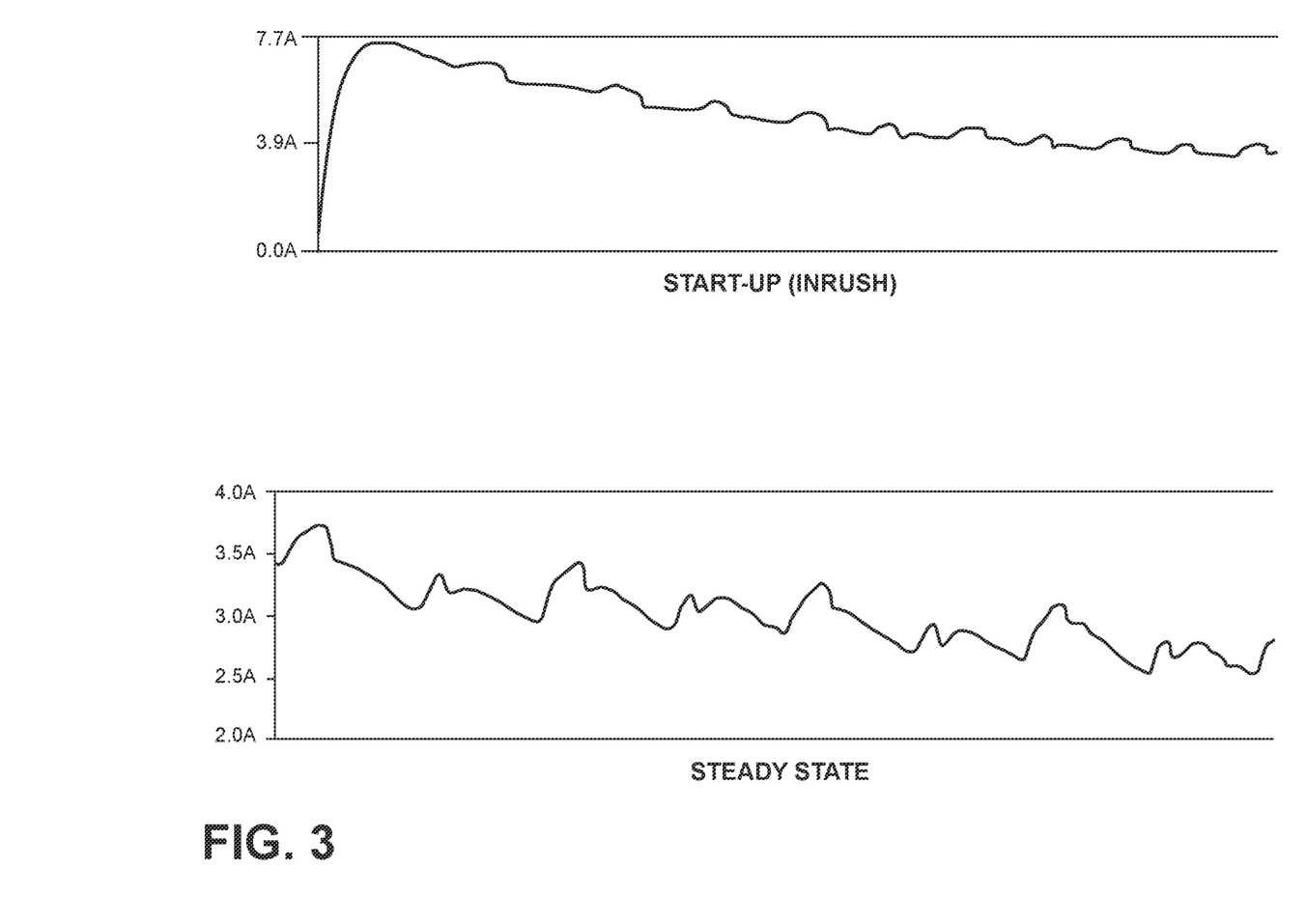
FIG. 3 includes graphs illustrating a motor current signal during the start-up and steady-state phases of operation.
Figure 4:
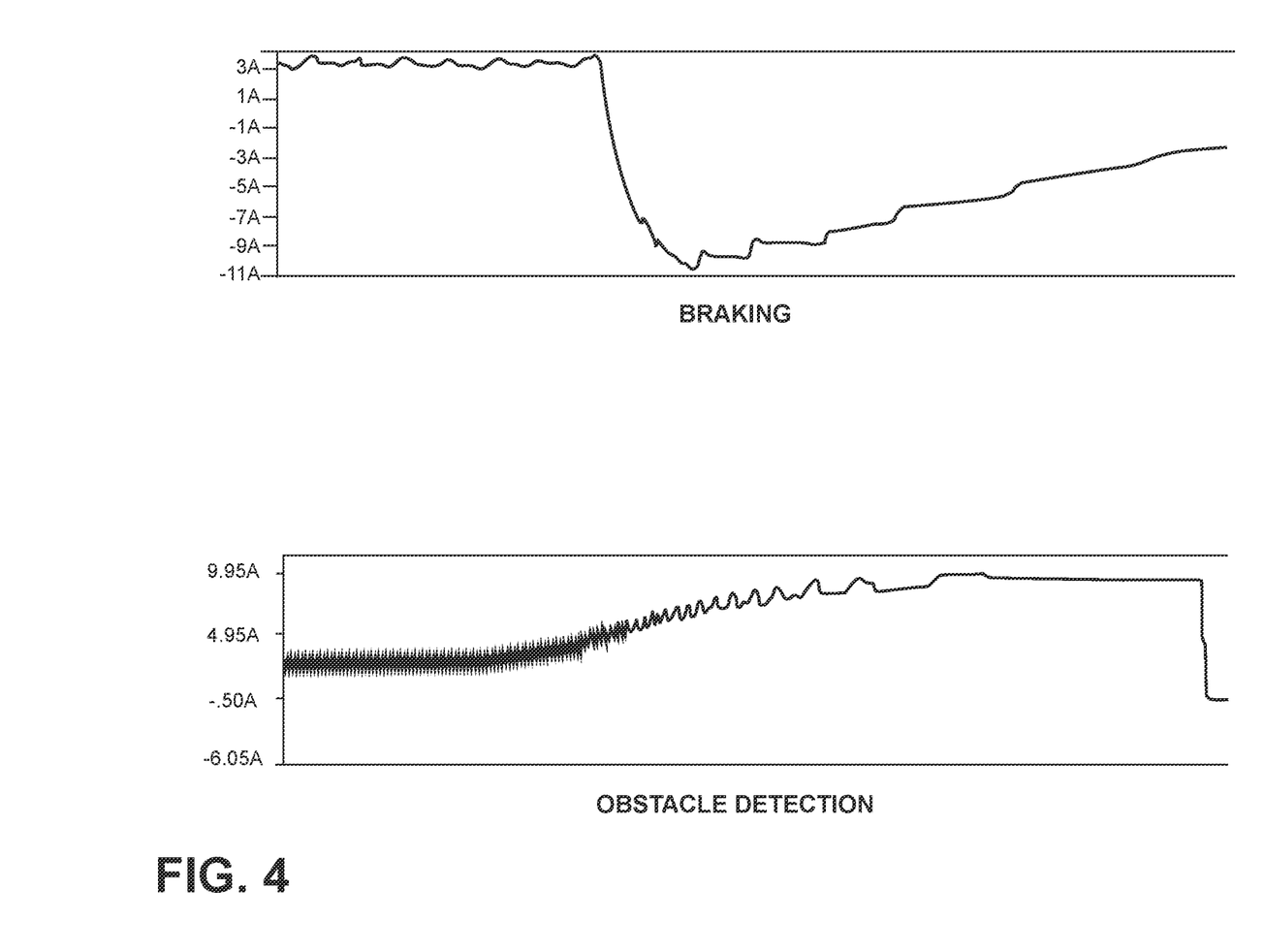
FIG. 4 includes graphs illustrating a motor current signal during the braking and obstruction detection phases of operation.

As noted above, the processor 18 is adapted to determine the rotational position of the DC motor armature, and consequently the position of the actuated device, during all phases of operation of the DC motor: start-up (inrush), steady state, braking, and obstruction detection. Motor current signals for the start-up and steady state phases of operation are shown in FIG. 3, and motor current signals for the braking and obstruction detection phases of operation are shown in FIG. 4. Existing sensorless solutions have proven effective at counting ripples during steady state and obstruction detection phases of operation (as used herein, "obstruction detection" means an unintended impeding or stopping of the motor). However, existing sensorless solutions have largely been ineffective at counting ripples during start-up and braking phases of operation. During start-up, for example, the inrush signal can be so large that fixed pole filtering cannot provide sufficient attenuation of the DC component at frequencies less than 1 Hz. As a result, the ripple signal is pushed out of bounds of the comparator window. During braking, the sudden reversal in motor current can mask ripples. In both phases of operation, the position of the actuated device is not reliably known. By contrast, the processor 18 of the present embodiment compensates for missed ripples in the start-up and braking phases of operation based on a determined ripple period or frequency in the steady-state phase of operation. By applying this determined ripple period or frequency to a transitional time interval, the number of missed ripples for each transitional phase of operation can be reliably determined in digital logic without relying on external positional sensors.

Figure 5:
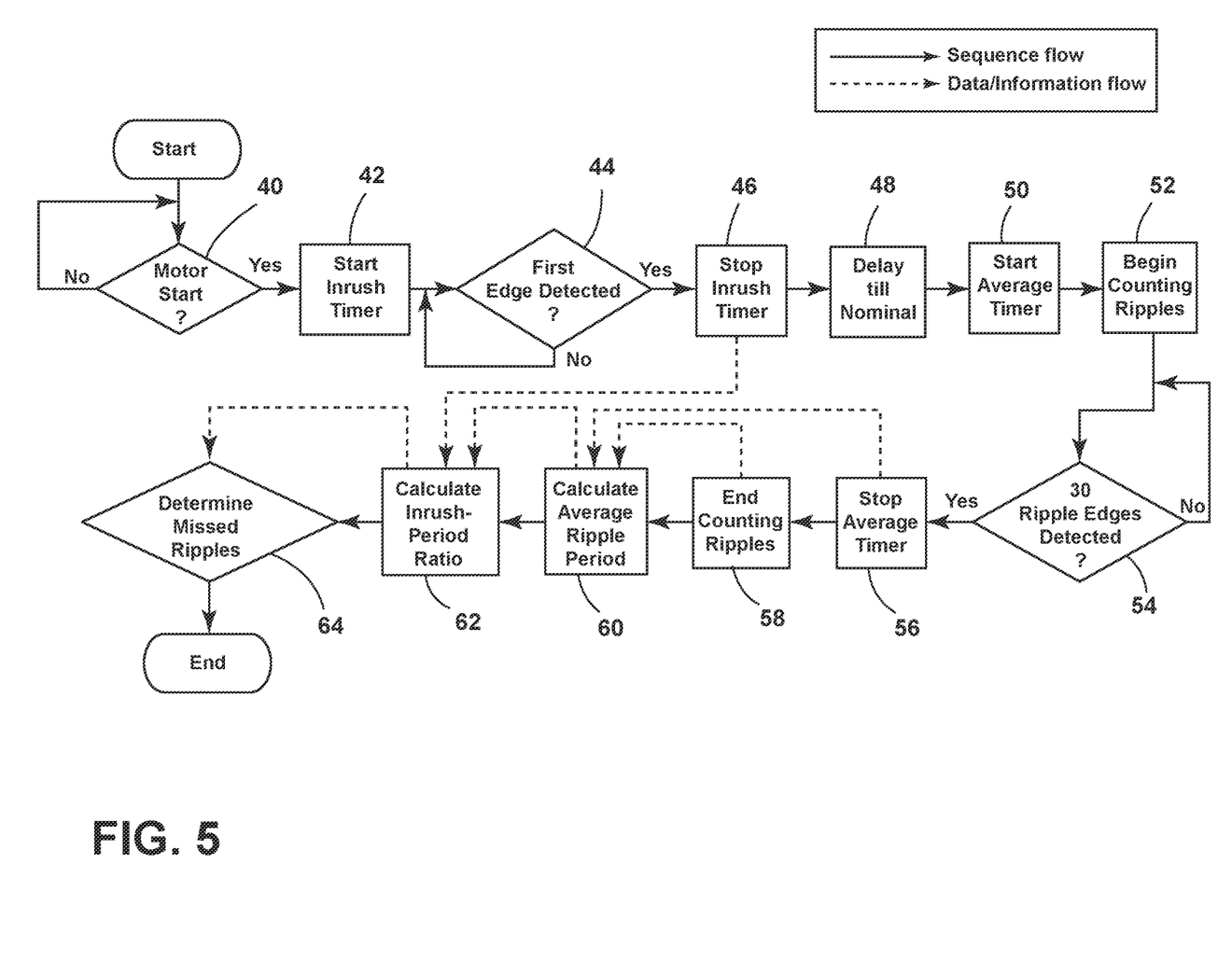
FIG. 5 is a flow-chart illustrating a ripple compensation algorithm during the start-up phase of operation.

Referring now to FIG. 5, a flow-chart outlining a method for counting ripples during the start-up phase of operation is illustrated. The method includes monitoring for button press signals from one or more seat controls at decision step 40. If a button press signal is received, an inrush timer is started at step 42 as the DC motor is activated by operation of a motor control module 36. When the first ripple edge is detected by the processor at decision step 44, the inrush timer is stopped at step 46. This first time interval ($\Delta t_{s1}$) is stored locally for later use by the processor (as used herein, the leading subscript "s" or "b" refers to the detection of ripples during start-up or braking, respectively, and the trailing subscript "1" or "2" refers to the transitional time interval or the steady-state time interval, respectively). The method then includes a predetermined time delay at step 48 to allow the ripples to achieve nominal parameters. At step 50, an average timer commences, and at step 52, the processor begins counting ripples. Each ripple is measured as a rising and falling edge in the digital output of the current sensing circuit 16. When a predetermined number of ripples are detected at decision step 54, for example 15 ripples (corresponding to 30 ripple edges), the average timer is stopped at step 56, yielding a second time interval ($\Delta t_{s2}$), and the processor stops counting ripples at step 58. The processor then calculates an average ripple period ($T_r$) or an average ripple frequency ($f_r$) at step 60 based on the second time interval ($\Delta t_{s2}$). For example, for n-number of counted ripples, the average ripple period ($T_r$) or frequency ($f_r$) is calculated by the processor as follows:

$$T_r = \Delta t_{s2}/n \quad (1)$$

$$f_r = n/\Delta t_{s2} \quad (2)$$

Equations (1) and (2): Start-up Phase

At step 62, the processor calculates an inrush-period ratio by dividing the first time interval ($\Delta t_{s1}$) by the average ripple period ($T_r$) or, conversely, by multiplying the first time interval ($\Delta t_{s1}$) by the average ripple frequency ($f_r$). At step 64, the processor determines a missed ripple count. The missed ripple count can be determined using empirical data, for example a look-up table stored to memory. The look-up table can correlate the inrush-period ratio with a missed ripple count, as optionally shown in Table 1 below:

TABLE 1

Period Ratio to Missed Ripple Count

| Period Ratio | Missed Ripple Count |
|---|---|
| <1 | 0 |
| 1 ≤ x < 4 | 1 |
| 4 ≤ x < 6.5 | 2 |
| 6.5 ≤ x < 7.5 | 3 |
| >7.5 | 4 |

Figure 6:
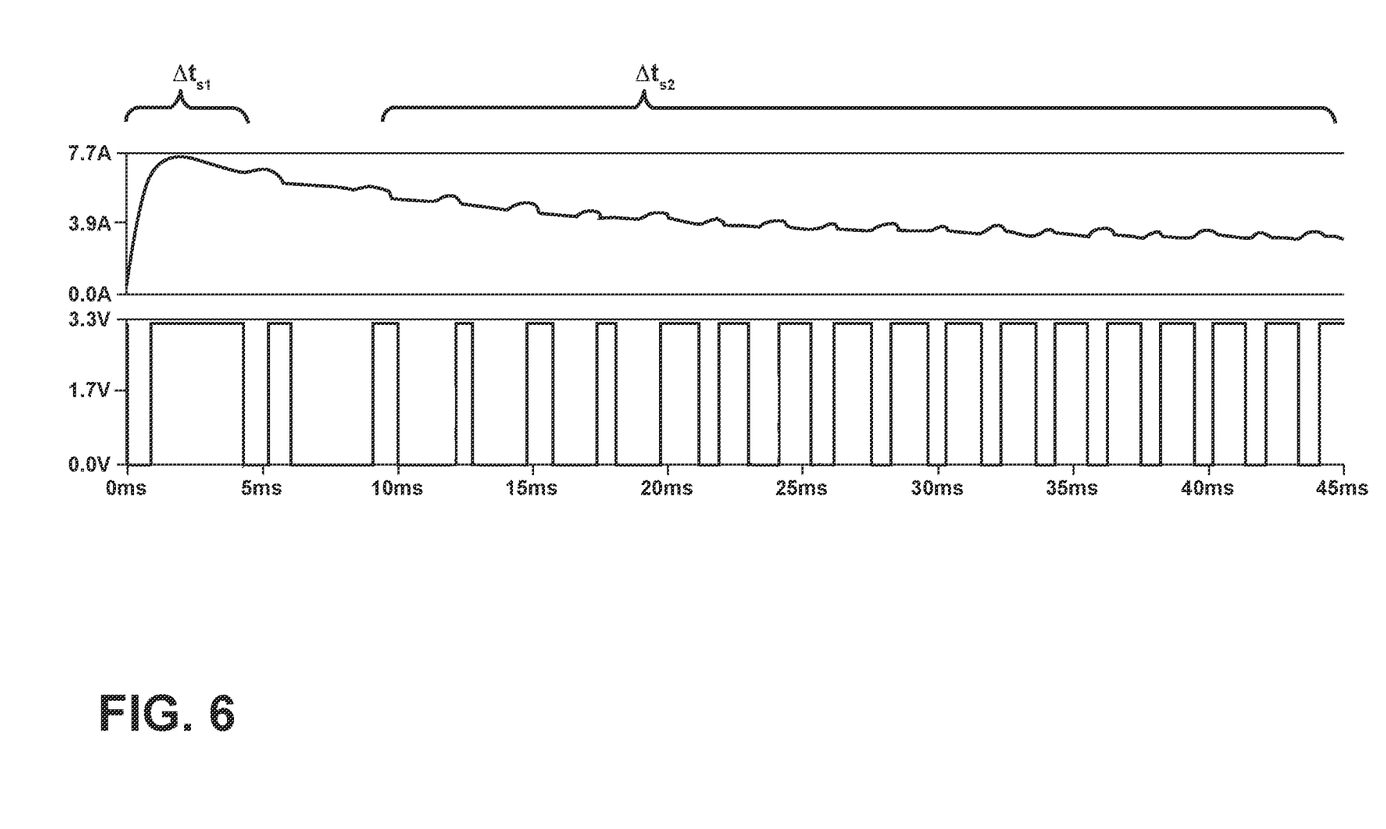
FIG. 6 includes graphs illustrating an analog current signal and a corresponding digital current ripple signal during start-up ($\Delta t_{s1}$) and steady-state ($\Delta t_{s2}$) phases of operation.

Alternatively, the processor can convert the inrush-period ratio into a missed ripple count by formula, for example by mapping the inrush-period ratio from a first range [0, 7.5] to an integer within a second range [0, 4]. The missed ripple count for start-up is then aggregated with the ripples counted in other phases of operation to reliably determine the rotational position of the DC motor. The current signal from the DC motor and the square wave output of the current measurement circuit 16 are each shown in FIG. 6. The first time interval ($\Delta t_{s1}$) terminates when the first ripple is detected, and the second time interval ($\Delta t_{s2}$) begins after a buffer period. By applying the average ripple period ($T_r$) or frequency ($f_r$) to the first time interval ($\Delta t_{s1}$), the number of missed ripples for start-up is reliably determined.

Figure 7:
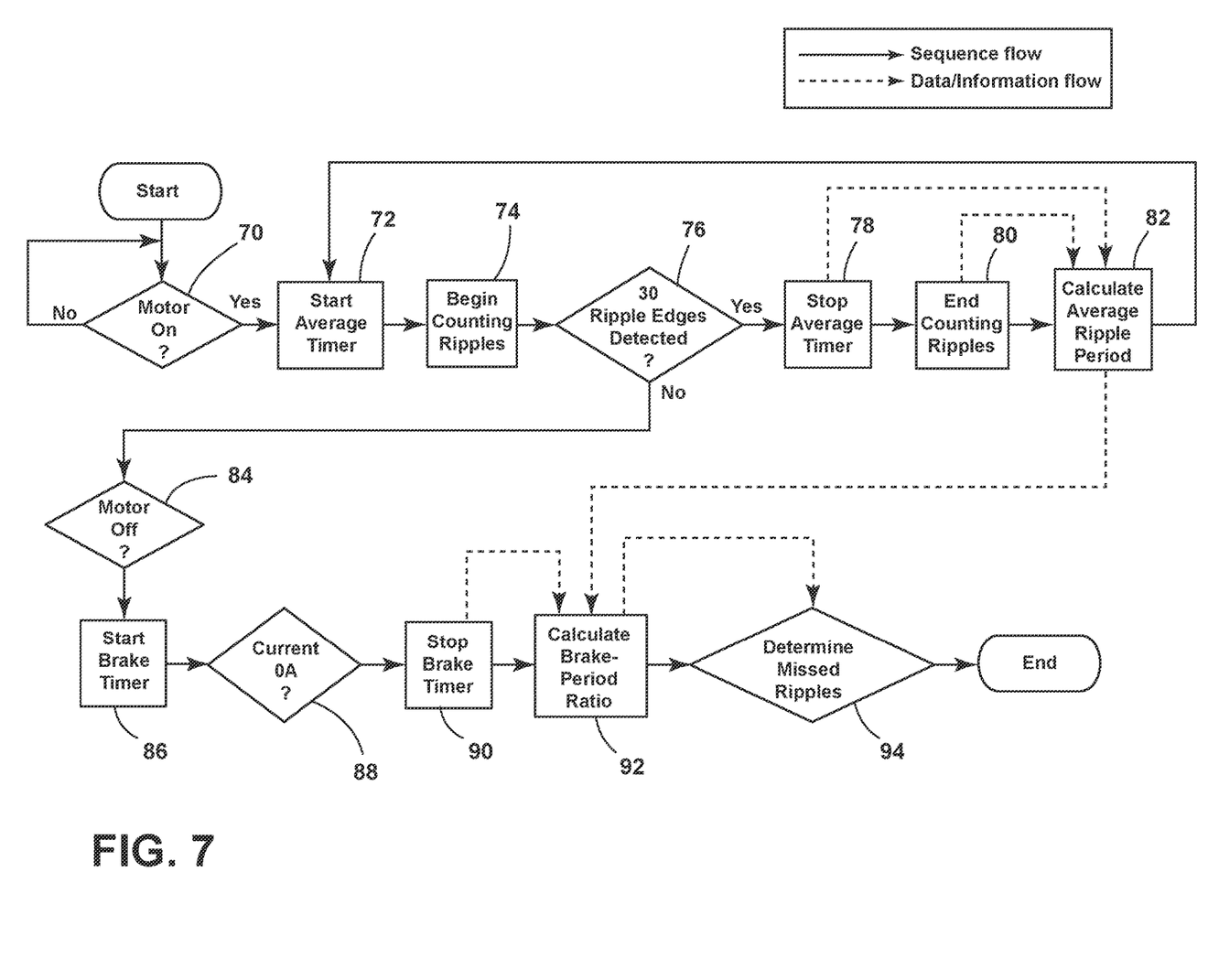
FIG. 7 is a flow-chart illustrating a ripple compensation algorithm during the braking phase of operation.

Referring now to FIG. 7, a flow-chart outlining a method for counting ripples during the braking phase of operation is illustrated. Upon detecting motor operation at decision step 70, the processor starts the average timer at step 72 and begins counting ripples at step 74. Once a predetermined number of ripples are detected at decision step 76, for example 15 ripples (corresponding to 30 ripple edges), the average timer is stopped at step 78, and ripples are no longer counted at step 80. At step 82, the processor calculates an average ripple period ($T_r$) or an average ripple frequency ($f_r$) based on the time interval ($\Delta t_{b2}$) required to count the predetermined number of ripples. For n-number of ripples, the average ripple period ($T_r$) or the average ripple frequency ($f_r$) is calculated by the processor as follows:

$$T_r = \Delta t_{b2}/n \quad (3)$$

$$f_r = n/\Delta t_{b2} \quad (4)$$

Equations (3) and (4): Braking Phase

The average ripple period ($T_r$) or the average ripple frequency ($f_r$) is continuously updated during operation of the motor based on a rolling sample of counted ripples during steady-state operation.

Figure 8:
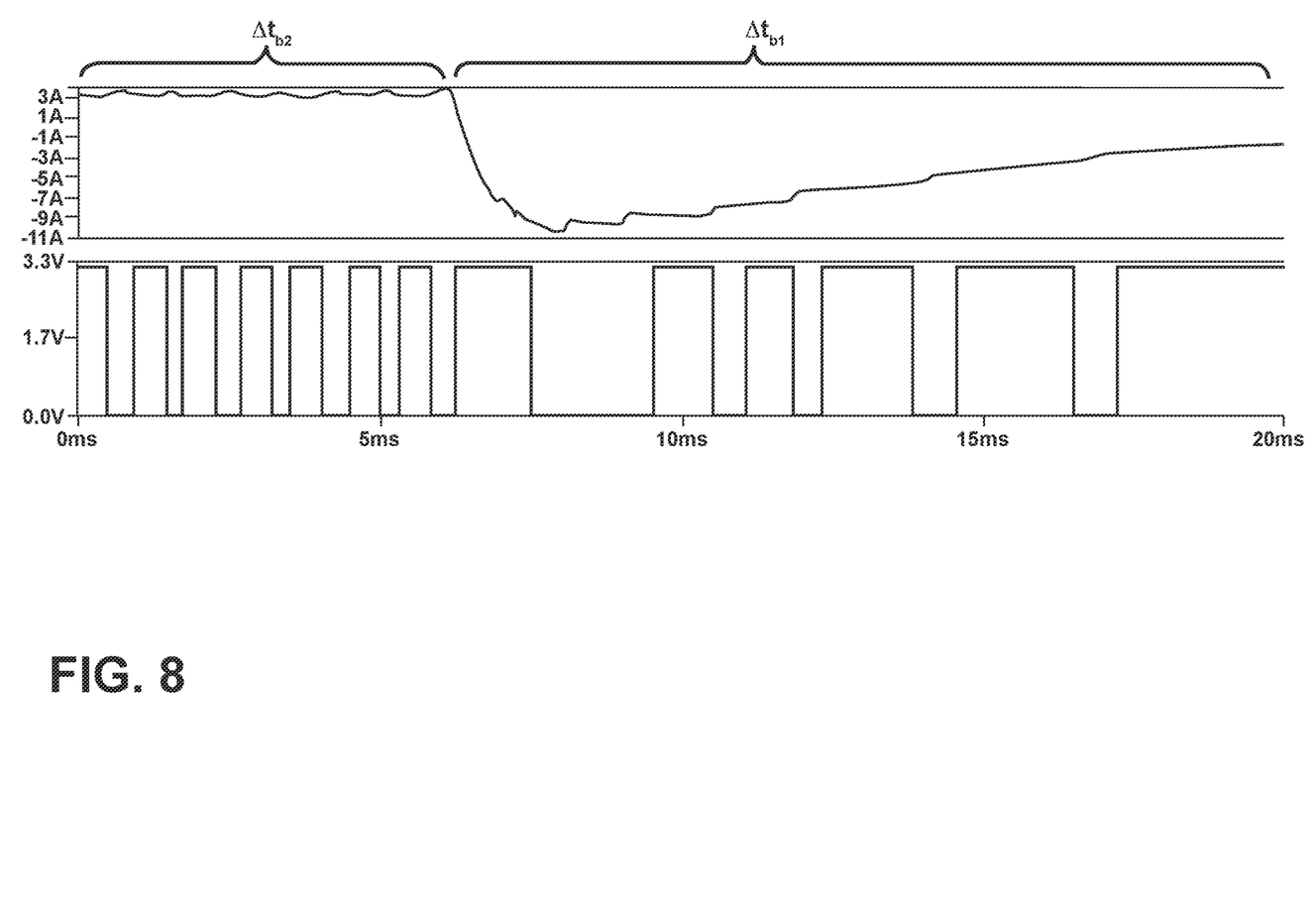
FIG. 8 includes graphs illustrating an analog current signal and a corresponding digital current ripple signal during braking ($\Delta t_{b1}$) and steady-state ($\Delta t_{b2}$) phases of operation.

If at decision step 84 the motor is off, the processor starts a brake timer at step 86. When the armature current has reached 0 A, as determined by the current sensing circuit at step 88, the processor stops the brake timer at step 90, yielding a braking time interval ($\Delta t_{b1}$). At step 92, the processor calculates a brake-period ratio by dividing the braking time interval ($\Delta t_{b1}$) by the average ripple period ($T_r$) or, conversely, by multiplying the braking time interval ($\Delta t_{b1}$) by the average ripple frequency ($f_r$). At decision step 94, the processor determines a missed ripple count. The missed ripple count can be determined using empirical data, for example a look-up table stored to memory. The look-up table can correlate the braking-period ratio with a missed ripple count, as optionally shown above in Table 1. The look-up table for determining missed ripples during the braking phase of operation can be identical to, or different from, the look-up table for determining missed ripples during the start-up phase of operation. Alternatively, the processor can convert the brake-period ratio into a missed ripple count by formula, for example by mapping the brake-period ratio from a first range [0, 7.5] to an integer within a second range [0, 4]. The missed ripple count for braking is then aggregated with the ripples counted in other phases of operation to reliably determine the rotational position of the DC motor. The analog current signal from the DC motor and the square wave output of the current measurement circuit 16 are each shown in FIG. 8. The braking time interval ($\Delta t_{b1}$) begins when the motor is off and ends when the current reaches 0 A. By applying the average ripple period ($T_r$) or frequency ($f_r$) to this time interval, the number of missed ripples for braking is reliably determined.

To reiterate, the processor determines a time interval corresponding to a transitional operating phase (e.g., start-up or braking) of a DC motor and determines a period or frequency corresponding to a steady-state operating phase. The processor then calculates a period ratio, which is converted into an-integer number of missed ripples with reference to a lookup table or formula. The missed ripples are then aggregated with the ripples that are counted in other phases of operation (e.g., steady-state or obstruction detection) to reliably determine the rotational position of the DC motor. For example, the aggregated ripple count is provided as an input to a motor control module, which multiples the aggregated ripple count by a rotational value, e.g., 120-degrees. The motor control module 36 then outputs the rotational position of the DC motor to a body control module (BCM) or other controller. By compensating for uncounted ripples during start-up and/or braking in digital logic, and without the aid of an external sensor, the present embodiment is well suited for applications where precise positional control of DC motors is required, optionally in the control of vehicle seats, power windows, side view mirrors, and vehicle lift gates, by non-limiting example.

The above description is that of current embodiments of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. The numeral values depicted in the Figures, including current values and time values, are exemplary and are not intended to be limiting. Any reference to elements in the singular, for example, using the articles "a," "an," "the," or "said," is not to be construed as limiting the element to the singular.

The invention claimed is:

1. A method for determining a rotational position of a DC motor, the method comprising:

determining a transitional time interval corresponding to a transitional operating phase of the DC motor, the transitional operating phase including start-up or braking of the DC motor;

determining a steady-state time interval required to detect a predetermined plurality of ripples in a motor current during a steady-state operating phase of the DC motor;

calculating an average ripple period or an average ripple frequency during the steady-state operating phase based on the determined steady-state time interval;

calculating a period ratio for the transitional operating phase based on the average ripple period or the average ripple frequency as applied to the transitional time interval, wherein the period ratio is the average ripple period divided by the transitional time interval; and determining a missed ripple count for the transitional operating phase based on the period ratio for the transitional operating phase.

2. The method of claim 1, wherein the transitional operating phase includes start-up of the DC motor.

3. The method of claim 2, wherein the transitional time interval is the time period between activation of the DC motor and detection of a ripple in the motor current of the DC motor.

4. The method of claim 3, wherein determining the transitional time interval includes starting a timer upon activation of the DC motor and stopping the timer upon detection of the ripple.

5. The method of claim 1, wherein the transitional operating phase includes braking of the DC motor.

6. The method of claim 5, wherein the transitional time interval is the time period between deactivation of the DC motor and detection of no motor current in the DC motor.

7. The method of claim 6, wherein determining the transitional time interval includes starting a timer upon deactivation of the DC motor and stopping the timer upon detection of no motor current in the DC motor.

8. The method of claim 1, wherein determining the missed ripple count is performed with reference to a look-up table stored to computer readable memory.

9. A method for determining a rotational position of a DC motor, the method comprising:

determining a transitional time interval corresponding to a transitional operating phase of the DC motor, the transitional operating phase including start-up or braking of the DC motor;

determining a steady-state time interval required to detect a predetermined plurality of ripples in a motor current during a steady-state operating phase of the DC motor;

calculating an average ripple period or an average ripple frequency during the steady-state operating phase based on the determined steady-state time interval;

calculating a period ratio for the transitional operating phase based on the average ripple period or the average ripple frequency as applied to the transitional time interval, wherein the period ratio is the average ripple frequency multiplied by the transitional time interval; and determining a missed ripple count for the transitional operating phase based on the period ratio for the transitional operating phase.

10. A system for determining the rotational position of a DC motor comprising:

a current sensing circuit for sensing a motor current of a DC motor, the motor current having a direct component and a ripple component; and a processor for processing a digital signal representing the ripple component of the motor current, wherein the processor is configured to:

determine a transitional time interval corresponding to a transitional operating phase of the DC motor;

calculate an average ripple period or an average ripple frequency during a steady-state operating phase of the DC motor;

determine a period ratio for the transitional operating phase of the DC motor, the period ratio being based on the average ripple period or frequency as applied to a duration of the transitional operating phase of the DC motor, wherein the period ratio is the average ripple period divided by the transitional time interval;

determine a missed ripple count for the transitional operating phase based on the period ratio and a look-up table or a formula; and determine the rotational position of the DC motor based on the missed ripple count for the transitional operating phase of the DC motor.

11. The system of claim 10, wherein the transitional operating phase includes start-up of the DC motor.

12. The system of claim 11, wherein the duration of the transitional operating phase of the DC motor is a time interval between activation of the DC motor and detection of a ripple.

13. The system of claim 10, wherein the transitional operating phase includes braking of the DC motor.

14. The system of claim 13, wherein the duration of the transitional operating phase of the DC motor is a time interval between deactivation of the DC motor and detection of no motor current of the DC motor.

15. The system of claim 10, wherein the digital signal includes a repeating series of rising and falling edges.

16. The system of claim 10, wherein the processor determines the rotational position of the DC motor by multiplying an aggregated number of ripple counts by a rotational value.

17. The system of claim 16, wherein the aggregated number of ripple counts includes ripple counts during the transitional operating phase and the steady-state operating phase.

18. A system for determining the rotational position of a DC motor comprising:

a current sensing circuit for sensing a motor current of a DC motor, the motor current having a direct component and a ripple component; and a processor for processing a digital signal representing the ripple component of the motor current, wherein the processor is configured to:

determine a transitional time interval corresponding to a transitional operating phase of the DC motor;

calculate an average ripple period or an average ripple frequency during a steady-state operating phase of the DC motor;

determine a period ratio for the transitional operating phase of the DC motor, the period ratio being based on the average ripple period or frequency as applied to a duration of the transitional operating phase of the DC motor, wherein the period ratio is the average ripple frequency multiplied by the transitional time interval;

determine a missed ripple count for the transitional operating phase based on the period ratio and a look-up table or a formula; and determine the rotational position of the DC motor based on the missed ripple count for the transitional operating phase of the DC motor.

\* \* \* \* \*